United States Patent
Robinson et al.

(10) Patent No.: US 6,442,625 B1
(45) Date of Patent: *Aug. 27, 2002

(54) MULTI-FUNCTION MODULE INCORPORATING FLASH MEMORY AND ENHANCED I/O INTERFACE THAT CAN TRANSLATE DATA FROM ONE FORMAT INTO ANOTHER FORMAT FOR SUBSEQUENT TRANSMISSION TO AN EXTERNAL DEVICE

(75) Inventors: Brian H. Robinson, San Pedro; Mark Moshayedi, Orange, both of CA (US)

(73) Assignee: SimpleTech, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/702,276

(22) Filed: Oct. 30, 2000

Related U.S. Application Data

(63) Continuation of application No. 09/063,513, filed on Apr. 21, 1998, now Pat. No. 6,154,788.
(60) Provisional application No. 60/045,105, filed on Apr. 25, 1997.

(51) Int. Cl.[7] ................................................. G06F 13/10
(52) U.S. Cl. ................................. 710/8; 710/10; 710/11
(58) Field of Search ................................. 710/8, 10, 11, 710/129; 713/1, 100; 711/115; 712/29

(56) References Cited

U.S. PATENT DOCUMENTS

| | | | |
|---|---|---|---|
| 4,928,300 A | 5/1990 | Ogawa et al. | |
| 4,937,781 A | 6/1990 | Lee et al. | |
| 5,113,396 A | 5/1992 | Kagami | |
| 5,206,731 A | 4/1993 | Takaiwa et al. | |
| 5,371,738 A | * 12/1994 | Moelard et al. | 370/331 |
| 5,373,512 A | 12/1994 | Brady | |
| 5,420,989 A | 5/1995 | Maher, III et al. | |
| 5,450,543 A | 9/1995 | Varga | |
| 5,454,067 A | 9/1995 | Tsai | |
| 5,488,610 A | 1/1996 | Morley | |
| 5,528,285 A | 6/1996 | Morikawa et al. | |
| 5,532,898 A | 7/1996 | Price | |
| 5,537,458 A | 7/1996 | Suomi et al. | |
| 5,541,640 A | 7/1996 | Larson | |
| 5,550,754 A | 8/1996 | McNelley et al. | |
| 5,781,558 A | * 7/1998 | Inglis et al. | 714/718 |
| 5,799,168 A | 8/1998 | Ban | |
| 5,818,603 A | 10/1998 | Motoyama | |
| 5,832,244 A | 11/1998 | Jolley et al. | |
| 5,835,772 A | 11/1998 | Thurlo | |
| 5,870,609 A | * 2/1999 | Thornton et al. | 717/11 |
| 5,893,135 A | 4/1999 | Hasbun et al. | |
| 5,901,152 A | 5/1999 | Tanaka et al. | |

* cited by examiner

*Primary Examiner*—Thomas Lee
*Assistant Examiner*—Thuan Du
(74) *Attorney, Agent, or Firm*—Knobbe, Martens, Olson & Bear, LLP

(57) ABSTRACT

A module incorporating a flash memory and a flash memory controller. The flash memory controller receives data via a first interface which can be a PCMCIA type interface. The data is then stored in the flash memory. The controller is adapted to be able to selectively recall the data from the flash memory and transmit the data to one or more recipient devices via the PCMCIA type interface or by an alternate interface. The module incorporates a user input device that, when manipulated by the user, induces the controller to send the data via the alternate interface. In one embodiment, the alternate interface is comprised of a GSM interface which allows data stored in the flash memory to be transmitted via a cellular telephone to a pre-selected telephone number by the user manipulating the user input device.

6 Claims, 6 Drawing Sheets

MULTI-FUNCTION MODULE INCORPORATING FLASH MEMORY AND ENHANCED I/O INTERFACE THAT CAN TRANSLATE DATA FROM ONE FORMAT INTO ANOTHER FORMAT FOR SUBSEQUENT TRANSMISSION TO AN EXTERNAL DEVICE

RELATED APPLICATIONS

This application is a continuation of U.S. application Ser. No. 09/063,513, now U.S. Pat. No. 6,154,788, filed Apr. 21, 1998, which claimed the benefit of U.S. Provisional Application No. 60/045,105 filed Apr. 25, 1997.

BACKGROUND OF THE INVENTION

1. Field of the Invention

The present invention relates to a module incorporating a memory and a microprocessor wherein the module has enhanced input-output capability and, more particularly, concerns a module incorporating an ATA flash memory and an ATA flash memory controller wherein the controller is configurable to have enhanced I/O capabilities so that the flash memory module can download stored data more readily.

2. Description of the Related Art

With the advent of small microprocessors and memory devices, many small electronic devices are now incorporating memories that store data that is captured by the device. These types of electronic devices include cameras, personal data assistants (PDA's), surveying equipment and electronic automotive equipment. One advantage of having a memory that can store data that is captured by the device is that the information in the memory can be downloaded to a computer at a subsequent time. For example, in a camera that incorporates a memory, the image captured by the camera can be stored in the memory and then downloaded directly into a computer. In applications such as creating a newspaper or magazine article, the ability to transfer photographs directly from a camera into a computer greatly facilitates the inclusion of photographs into the newspaper or magazine article.

Presently, the typical type of memory that is used in the small electronic devices is known as a flash memory. A flash memory is a readable/writable device where data can be written to the memory and then recalled and provided to an output interface. Flash memories generally incorporate a microprocessor that acts as a flash memory controller. The flash memory controller is configured to store the information that is received in memory locations and then recall the stored data when the flash memory is outputting stored data to an external source. The flash controller also performs functions such as ascertaining which sections of the flash memory are bad and bypassing these sections during read and write cycles. Typically, modules incorporating the flash memories and the controller are built to be connected to the electronic device through a well-known connection interface, such as a PCMCIA slot.

While the existence of flash memories has greatly expanded the versatility of some small electronic devices, flash memories are generally limited to outputting stored data through a single input-output interface. Specifically, the electronic devices incorporating flash memories that are currently available are only able to download data to external sources through an ATA flash interface. Hence, the external source that receives the stored data from the flash memory in the electronic device, e.g., a personal computer, has to have an interface that is configured to receive the data from the memory.

For example, a camera that incorporates a flash memory can generally only be interfaced with a personal computer that has an I/O port that is specifically configured to receive the flash memory data via the flash memory's ATA flash interface. Understandably, this reduces the flexibility of using electronic devices incorporating flash memories as these devices must effectively be tied to an external source that is specifically configured to receive flash memory data.

However, it will be appreciated that in some circumstances it may be desirable to be able to receive data that is stored within a flash memory through an interface other than a standard ATA flash memory interface. For example, in some circumstances it would be advantageous for cameras that incorporate ATA flash memories to be able to download information to a remotely located computer via a telephone modem. Still further, if the camera could download data to a remotely located computer terminal over a cellular telephone, photos could be transmitted directly to the publisher from the photo location. Presently, to be able to achieve these results would require that the telephone modem or cellular phone be specifically configured to receive the flash memory data and, consequently, have a flash memory interface. It will be understood, of course, that not all modems and telephones have such an interface and that adding this particular interface to these devices would not generally be justified from a cost standpoint.

Hence, there is a need for a flash memory module which incorporates I/O capabilities in addition to the standard flash memory I/O interface. Preferably, this module would be constructed at a cost comparable to existing flash memory modules and would incorporate alternative I/O capabilities in a manner that would allow for simple transmission of data stored in the flash memory via the alternative I/O interface.

SUMMARY OF THE INVENTION

The aforementioned needs are satisfied by the flash memory module of the present invention which is comprised of one or more flash memories, a microprocessor which receives data to be stored in the flash memories from a flash memory I/O port, and an alternative interface wherein the microprocessor is configured to enable the alternative interface and transmit data from the flash memory via the alternative interface in response to an external command. Consequently, the memory module of the present invention is capable of receiving data to be stored in a flash memory and then exporting the data from the flash memory via at least two or more different interfaces.

In one embodiment of the present invention, the memory module has a PCMCIA interface that is capable of receiving not only flash memory data, but is also capable of receiving configuration commands from a computer. The configuration commands can be used to configure the alternative interface so that the alternative interface is capable of downloading data from the flash memory to an external source.

In one specific example, the preferred embodiment includes a UART and an interface that is suitable for transmitting the data from the flash memory to a cellular telephone modem in response to a single external command whereby the data is transmitted to an external destination source such as a personal computer. The configuration commands for the alternate interface, in this instance, would include a GSM interface and the telephone number that the cellular telephone modem is to dial. Hence, data that is stored within the flash memory can be transmitted via a modem to a remote location by the delivery of a single external command to the memory module.

It will be appreciated that, if the module of the preferred embodiment is used in a camera, an image that is stored within the flash memory can be transmitted via a cellular phone by the manipulation of a button on the camera which would provide the external command to the memory module to output the data via the alternate interface to the cellular phone. The cellular phone would also receive the appropriate GSM interface and the telephone number to dial from the microprocessor as this information had previously been stored within the memory module.

It will be appreciated that the memory module of the present invention greatly enhances the flexibility of using flash memories as it allows the flash memory to be used with a number of different interfaces. These and other objects and advantages of the present invention will become more fully apparent from the following description taken in conjunction with the accompanying drawings.

DETAILED DESCRIPTION OF THE PREFERRED EMBODIMENT

Figure 1:
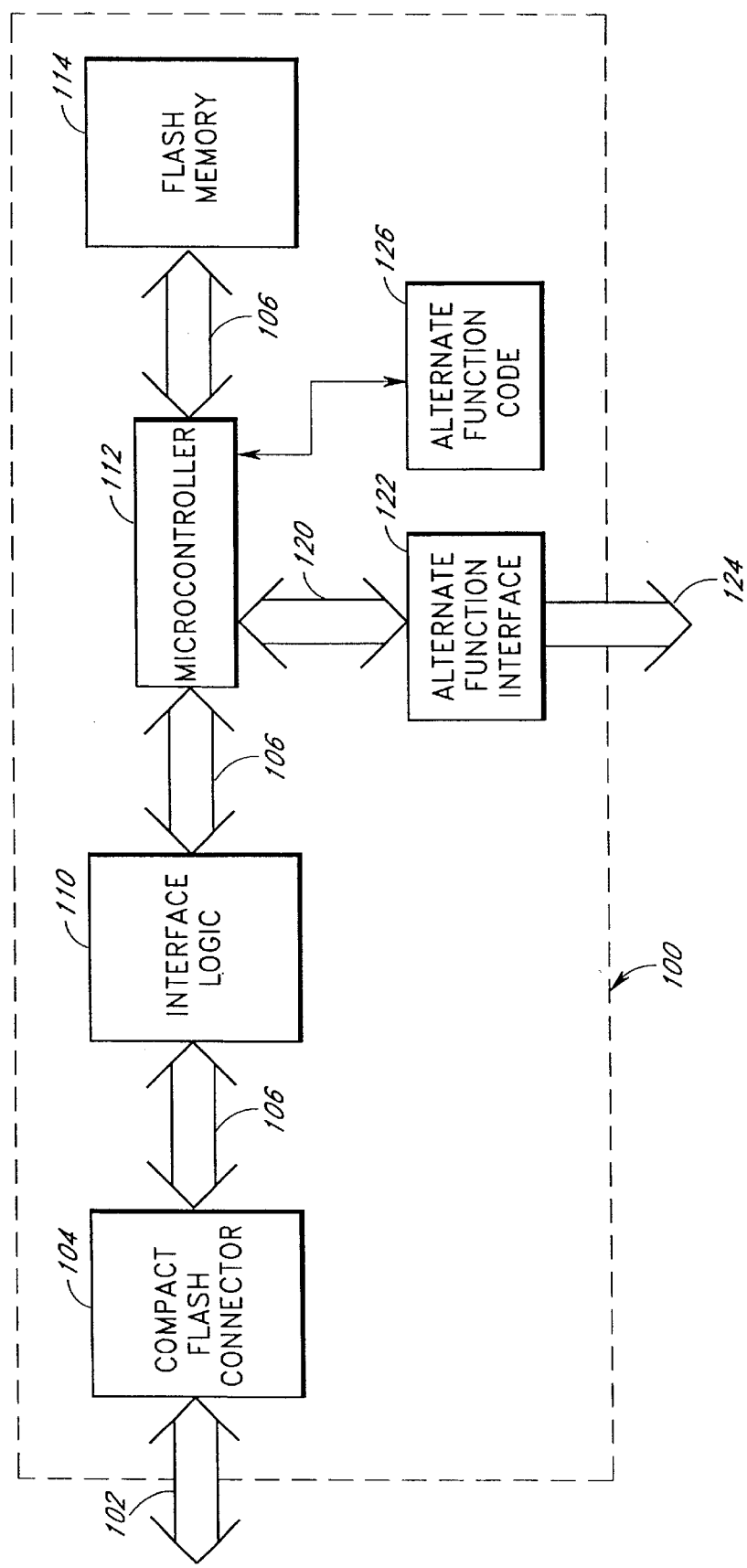
FIG. 1 is a block diagram illustrating one embodiment of the flash memory module of the present invention.

Reference will now be made to the drawings wherein like numerals refer to like parts throughout. FIG. 1 is a block diagram which illustrates the basic configuration of a flash memory module 100. The flash memory module 100 receives data via a bidirectional data bus 102. The data bus 102 is connected to a compact flash connector 104 of a type that is well known in the art which is, in turn, connected to an internal data bus 106. The internal data bus 106 provides the data via interface logic 110 to a microcontroller 112. The microcontroller 112 then is capable of storing the data in a flash memory 114 in a manner that is well known in the art. Similarly, the microcontroller 112 can read data from the flash memory 114 and output the data on the data bus 102 to an external source via the interface logic 110 and the compact flash connector 104. The operation of the flash memory module 100 in this sense is substantially identical to the operation of the flash memory modules of the prior art.

However, as shown in FIG. 1, the flash memory module 100 also includes a data bus 120 which interconnects the microcontroller 112 with an alternate function interface 122. The alternate function interface 122 thereby provides data that is retrieved by the microcontroller 112 from the flash memory 114 to an alternate function output 124. Further, the memory module 100 also includes an alternate function code 126 which provides information to the microcontroller 112 so that the microcontroller 112 can implement the alternate function interface 122 to thereby be able to transmit data from the flash memory 114 to the alternate function output bus 124.

The alternate function interface 122 can be comprised of any of a number of interfaces, including GSM modem interfaces, serial I/O, parallel I/O, ISDN interfaces, twisted pair interfaces, fiber interfaces and IRDA interfaces. Hence, the microcontroller 112 is capable of retrieving data that is stored in the flash memory 114 in the usual manner and, instead of outputting this data on the flash data bus 102, the microcontroller 112 can route this data to an alternate function interface 122 that outputs the data on an output bus that is configured differently than the flash interface. When the memory module 100 is included in a small electrical device such as a camera, survey equipment, a handheld portable computer, a PDA or the like, the microcontroller 112 can be configured to output the data either via the ATA flash interface or via the alternate interface. Further, the alternate function interface 122 can be configurable as a result of the alternate function code 126 being stored within the flash memory module 100. This greatly enhances the flexibility in interfacing an electronic device incorporating flash memory modules with external devices as the electronic devices which incorporate the flash memory module 100 of the preferred embodiment can now be interfaced with other external devices that do not typically include an ATA flash interface.

Figure 2:
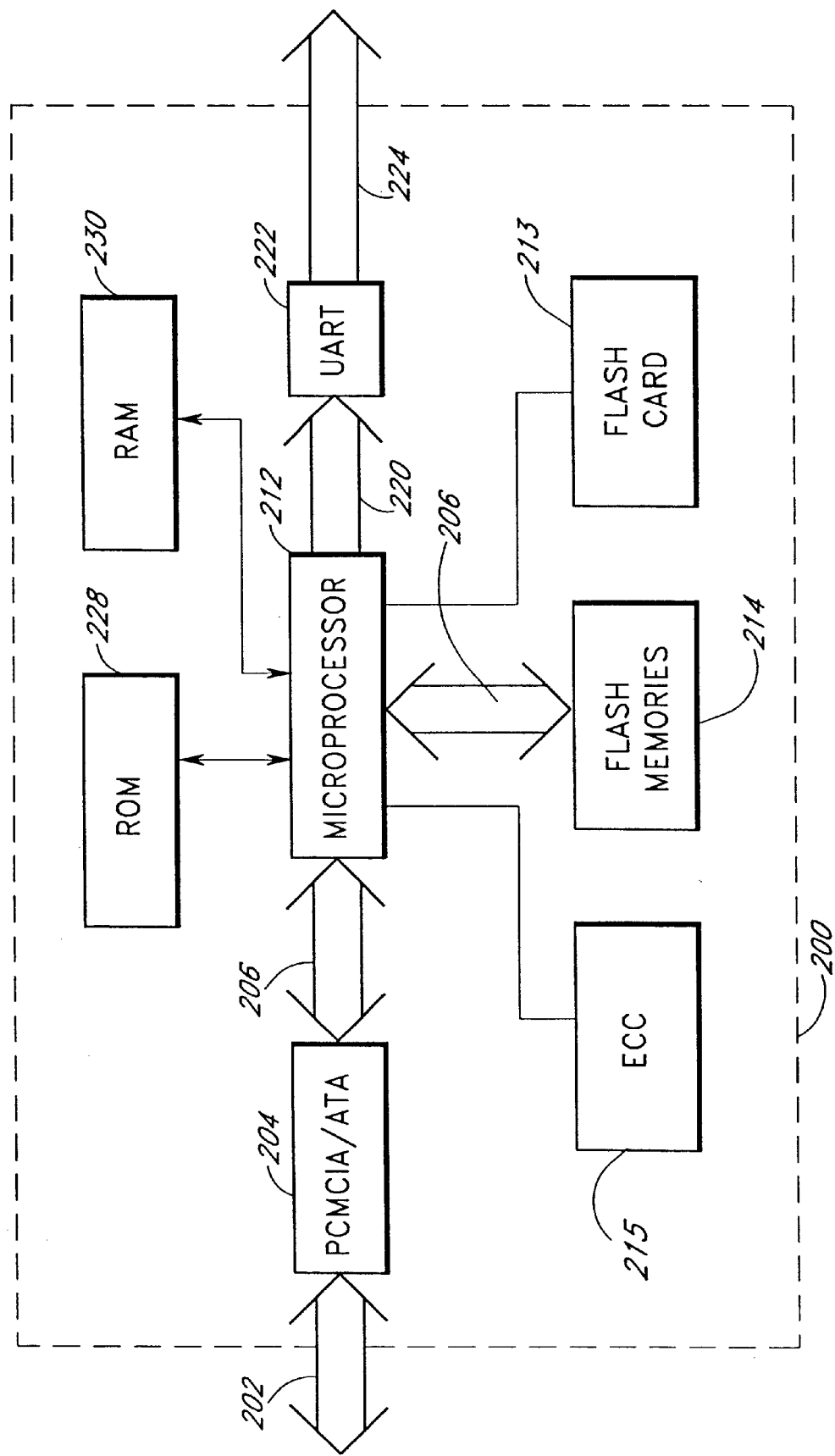
FIG. 2 is a more detailed embodiment of the flash memory module of the preferred embodiment.

FIG. 2 is a more specific embodiment of a flash memory module 200 that incorporates a GSM cellular phone interface so that data stored within a flash memory can be transmitted to a remote location via a cellular phone modem. In particular, the memory module 200 includes a PCMCIA/ATA card 204 which is connected to a data bus 202 and to a microprocessor 212 via an internal bus 206. The microprocessor is also connected to one or more flash memories 214 via the data bus 206 and the microprocessor 212 also is associated with a ROM memory 228 and a RAM memory 230. Data that is to be stored in the flash memory 214 is imported along the bus 202 to the PCMCIA/ATA card 204 where it is accessed by the microprocessor 212 and is stored on a write cycle in the flash memory 214 in a well known manner. Similarly, data that is stored in the flash memories 214 can be accessed by the microprocessor 212 on a read cycle and provided via the PCMCIA card 204 to the data bus 202 in a well known manner. The module 200 also includes an error correction circuit 215 and a flash card 213 which perform functions that are well known in the art. The flash memory module 200 also includes a UART 222 that receives data from the microprocessor 212 via an output bus 220 that is to be transmitted to an output bus 224 going to an external cellular phone (not shown).

In this embodiment, the PCMCIA/ATA card 204 and microprocessor 212 is not only capable of transferring data to and from the flash memories 214, but it is also capable of receiving configuration instructions from an external source, such as a personal computer, and storing the configuration instructions in the RAM 230. Hence, the memory module 200 can receive interface instructions that can be stored in the RAM 230 so that when the microprocessor 212 is outputting data through the UART 222 to the output bus 224 using an alternate function interface, the appropriate interface can be enabled.

In one specific example, the microprocessor 212 can receive a GSM cellular phone interface and a telephone number to call which is then stored in the RAM 230. When the alternate function interface is enabled by the microprocessor 212, preferably in response to some external signal, the microprocessor 212 can send the appropriate GSM cellular phone interface via the UART 222 to the output bus along with the data that is stored within the flash memories 214 that is to be transmitted via a cellular phone to an external source.

Figure 3:
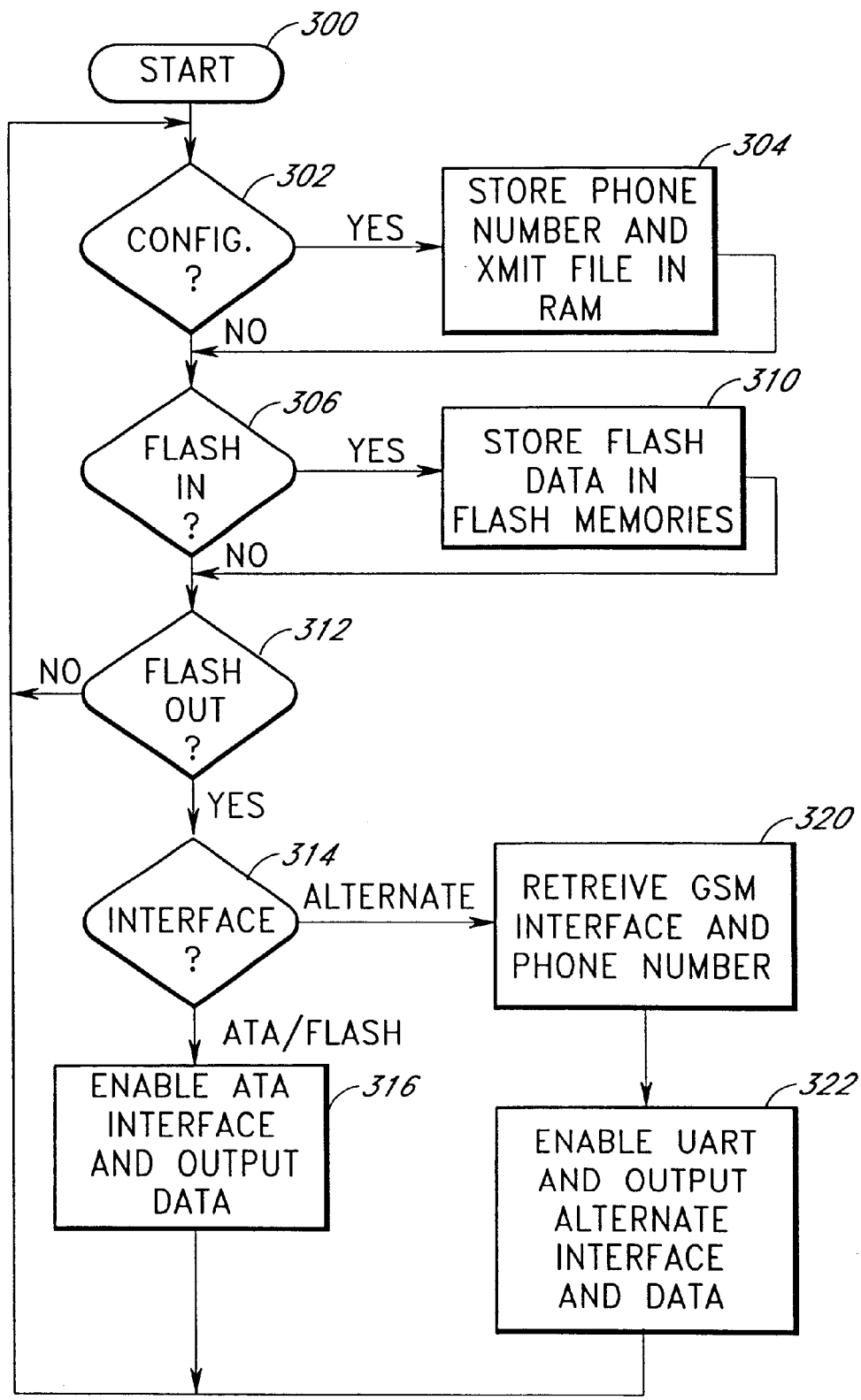
FIG. 3 is an exemplary flow chart illustrating the operation of the flash memory module of FIG. 2.

FIG. 3 is a flow chart which illustrates the operation of the microcontroller 212 in the flash memory module 200 shown in FIG. 2. The steps in the flow chart are simply illustrative of the functional steps performed by the microcontroller 212, however, a person of ordinary skill in the art will appreciate that the exact sequence of operation of the microcontroller 212 in order to perform the functions described in the flow chart of FIG. 3 may vary. Referring now to FIG. 3, the microprocessor 212, from a start state 300, initially determines, in decision state 302, whether the alternate function interface is being configured. Typically, the alternate function interface is downloaded to the microprocessor 212 via the PCMCIA card 204. In the specific example of a GSM cellular phone interface, the interface and the telephone number are stored, in state 304, in the RAM 230 after it has been received by the microprocessor 212 from an external source via the PCMCIA card 204.

Subsequently, the microprocessor 212 then determines, in decision state 306, whether data is being provided via the bus 202 that is to be written to the flash memories 214. In the event that the data is to be stored in the flash memories 214, the microprocessor 212 then stores this data in the flash memory 214 in state 310 in a manner that is well known in the art. Subsequently, the microprocessor 212 then determines in decision state 312 whether data is being read out of the flash memories 214. If data is being read out of the flash memories 214, the microprocessor 212 then determines, in decision state 314, whether the data is being provided via the ATA flash interface or via the alternative interface. In the event that the data is being provided by the ATA flash interface, the microprocessor 212 then, in state 316, enables the ATA interface on the PCMCIA/ATA card 204 and provides the data via the bus 202. In the event that the microprocessor 212 determines that the data is being provided by the alternative interface, the microprocessor 212 then retrieves, in state 320, the GSM interface and the phone number from the RAM 230 and then enables the UART 222 in state 322 and provides the alternative interface and data to the UART which can then be transmitted to the output bus 224. The microprocessor 212 will preferably receive an external signal from the electronic device that incorporates the flash memory module 200 as to which interface will be providing the data.

It will be appreciated that the flash memory module 200 shown in FIG. 3 can be incorporated into a camera and the telephone number and GSM cell phone interface can be downloaded via the PCMCIA card into the memory module that is positioned within the camera. Subsequently, the camera can take a picture which can be stored in the flash memories 214. The microprocessor 212 can then be instructed to provide the picture via the UART 222 to an output data bus 224 that is connected to a cellular phone. The data corresponding to the photograph can then be transmitted via the cellular phone to a remote location. By previously downloading the interface and the telephone number into the module, the operation of the microcontroller 212 in providing the data via an alternate interface is simplified as it simply requires the microcontroller 212 to receive a single command to induce the microcontroller 212 to retrieve the data corresponding to the photograph and the appropriate interface information and then provide this data and information to the output bus 224. Hence, the stored data can be easily transmitted to an external source using the alternate interface capabilities of the module 200.

Figure 4:
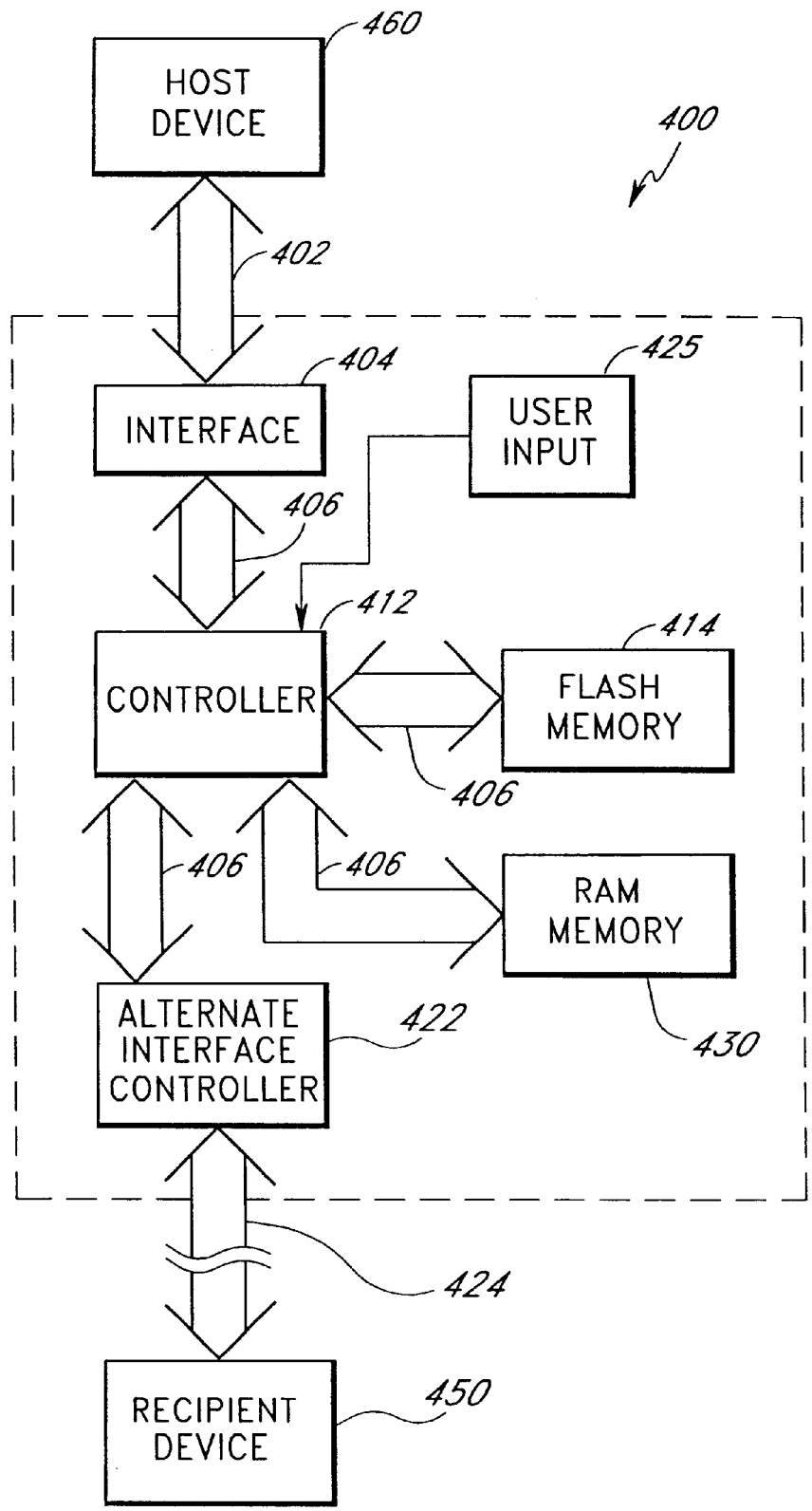
FIG. 4 is a block diagram illustrating another embodiment of a flash memory module of the present invention.

FIG. 4 is a block diagram illustrating another embodiment of a flash memory module incorporating an alternate interface to allow information stored within the flash memory to be provided to a recipient device via an alternate interface. The module 400 includes a controller 412 similar to the microprocessors discussed above. Information from the host device 460 is provided via an external bus 402 to an interface 404. The information from the interface 404 is then provided to the controller 412 via an internal bus 406. As discussed above, the interface 404 can be a typical PCMCIA/ATA-type interface that is capable of receiving flash data in and also transferring flash data out. Further, the interface 404 is also capable of receiving additional information from the host or a personal computer (not shown), such as configuration information for the alternate interface. The controller 412, when receiving flash data from the interface 404 via the internal bus 406, transfers this information to the flash memory 414 via the internal bus 406 and this information is stored in the flash memory 414 in a manner that is known in the art. Similarly, when the controller 412 is receiving configuration signals for the alternate interface, this information is passed to a readable, writable memory, such as a RAM memory 430, via the internal bus 406.

The controller 412 is adapted to download the data stored in the flash memory 414 via the interface 404 when the module 400 is connected to a recipient device via the interface 404. This operation is performed in the same manner that flash memory data is downloaded using prior art flash memory modules. Alternatively, the controller 412, in response to a signal from a user input 425, downloads the information in the flash memory 414 via the alternate interface controller 422.

It will be appreciated that some of the alternate interfaces may require that significant data processing be performed on the stored flash data so as to be able to download the information via the alternate interface. Consequently, the alternate interface may necessitate a separate controller, such as a microprocessor, that is capable of receiving the data stored in the flash memory 414 and then translating this information into the desired interface format. For example, if the module 400 is to be used with a cellular phone, the flash memory may have to be translated into a GSM interface compatible format and, more particularly, be specifically adaptable so as to be readable and transmittable by a particular manufacturer's model of a cellular phone. In one embodiment, the interface controller 422 can translate and build a GSM compatible information packet that is suitable for subsequent transmission by a cellular phone as will be described in greater detail below.

Figure 5A:
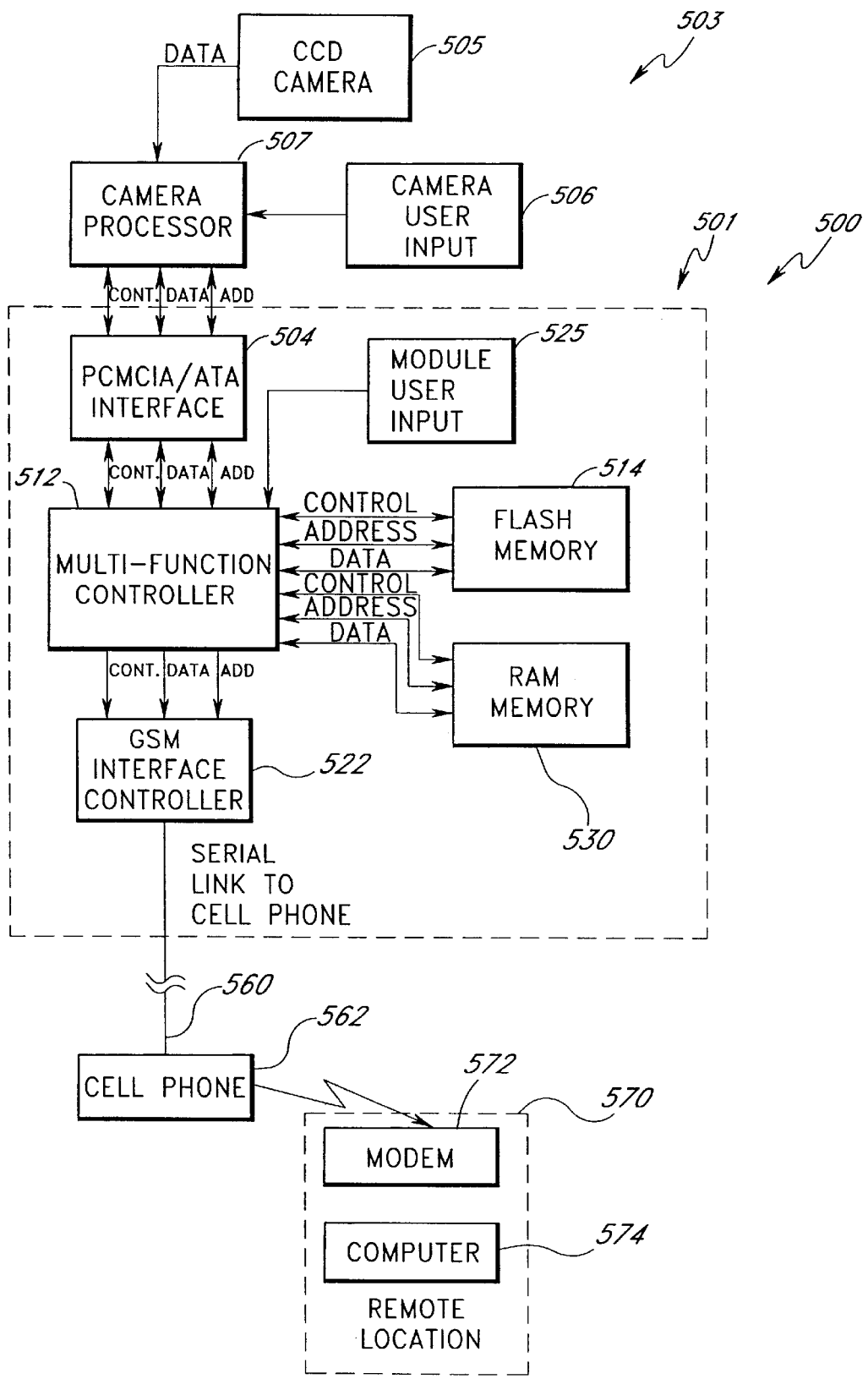
FIG. 5A is a block diagram illustrating an exemplary application of the flash memory module of FIG. 4 as adapted to be used with a digital camera to download information to a cellular phone for transmission to a host location.

FIG. 5A is a particular example of how the flash module 400 can be adapted for a particular purpose. Specifically, FIG. 5A is a block diagram of a digital camera system 500 incorporating a flash module 501 that is capable of receiving digital photos from a digital camera and storing them in a flash memory and then, in response to the user manipulating a user input device, translating the information into a GSM interface and providing the information to a cellular phone so that the stored digital photograph can be transmitted to a remote location. The system 500 is adapted so that the user simply has to manipulate the user input device and the module 501 provides all of the necessary information to the cellular phone to instruct the cellular phone to dial a preselected telephone number and then transmit the data stored in the flash memory corresponding to a particular picture to the remote location.

Referring specifically to FIG. 5A, the system 500 incorporates a camera 503 substantially identical to digital cameras that are presently available. In general, these types of digital cameras incorporate a CCD camera 505 that obtains a digital image in response to the user manipulating a user input device 506. The user input device 506 is typically in the form of a button which operates a mechanical shutter positioned in a lens in front of the CCD camera. The data captured by the CCD device 505 is then provided to the camera processor 505 for processing in a manner that is known in the art.

Subsequently, the camera processor 507 provides the picture data to the flash module 501 for storage in a flash memory. Specifically, the data is provided to the module 501 via a PCMCIA/ATA interface 504. The data is then received by a multi-function controller 512 via various control data and address lines. The controller 512 can then store the information in one or more flash memories 514 via various control address and data lines in a manner that is again known in the art. Subsequently, the multi-function controller 512 can either download the information stored in the flash memory 514 via the PCMCIA interface 504 or via the GSM interface controller 522. If the photograph is to be downloaded via the PCMCIA/ATA interface 504, then the multi-function controller 512 downloads this information in a manner that is known in the art. Generally, the module 501 is typically dismounted from the camera 503 and loaded into a port on a computer and the computer then extracts the pictures from the flash memory 514 in the interface 504.

However, if the user manipulates the user input device 525 to indicate that one or more photographs are to be transmitted via a cellular telephone, the multi-function controller 512 then recalls previously stored configuration information from the RAM memory 530 and also the information stored in the flash memory and provides this information to the GSM interface controller 522. The GMS interface controller 522 then builds a data packet to be transmitted via a serial link 560 to a cellular telephone 562. The data packet will include a dial command with a telephone number for the cellular telephone to call and also includes the digital data corresponding to the stored photo after it has been translated into a GSM compatible format and, in particular, into a GSM compatible format that is specific to the particular cell phone 562.

The telephone number and configuration information is preferably previously downloaded to the memory 530 when the user initially configures the module 501. This process is performed by connecting the module 501 to a computer and downloading an instruction set via the interface 504 in a manner similar to the process described above in conjunction with FIG. 2. It will be appreciated that the exact interface used by different manufacturers of cellular telephones varies so the configuration information that is downloaded into the RAM memory 530 must be tailored for particular manufacturers of cell phones.

Once the data packet is built, the packet is provided to the cellular telephone 502 via the serial link 560 and the cellular phone 562 is preferably adapted to automatically dial a modem 572 at a remote location 570 so that the data packet can be transmitted to a computer 574. In this application of the ATA/flash module of the present invention, photographs can be taken with a digital camera and then transmitted to a remote location via a cellular telephone by the user simply manipulating a user input device on the camera.

Figure 5B:
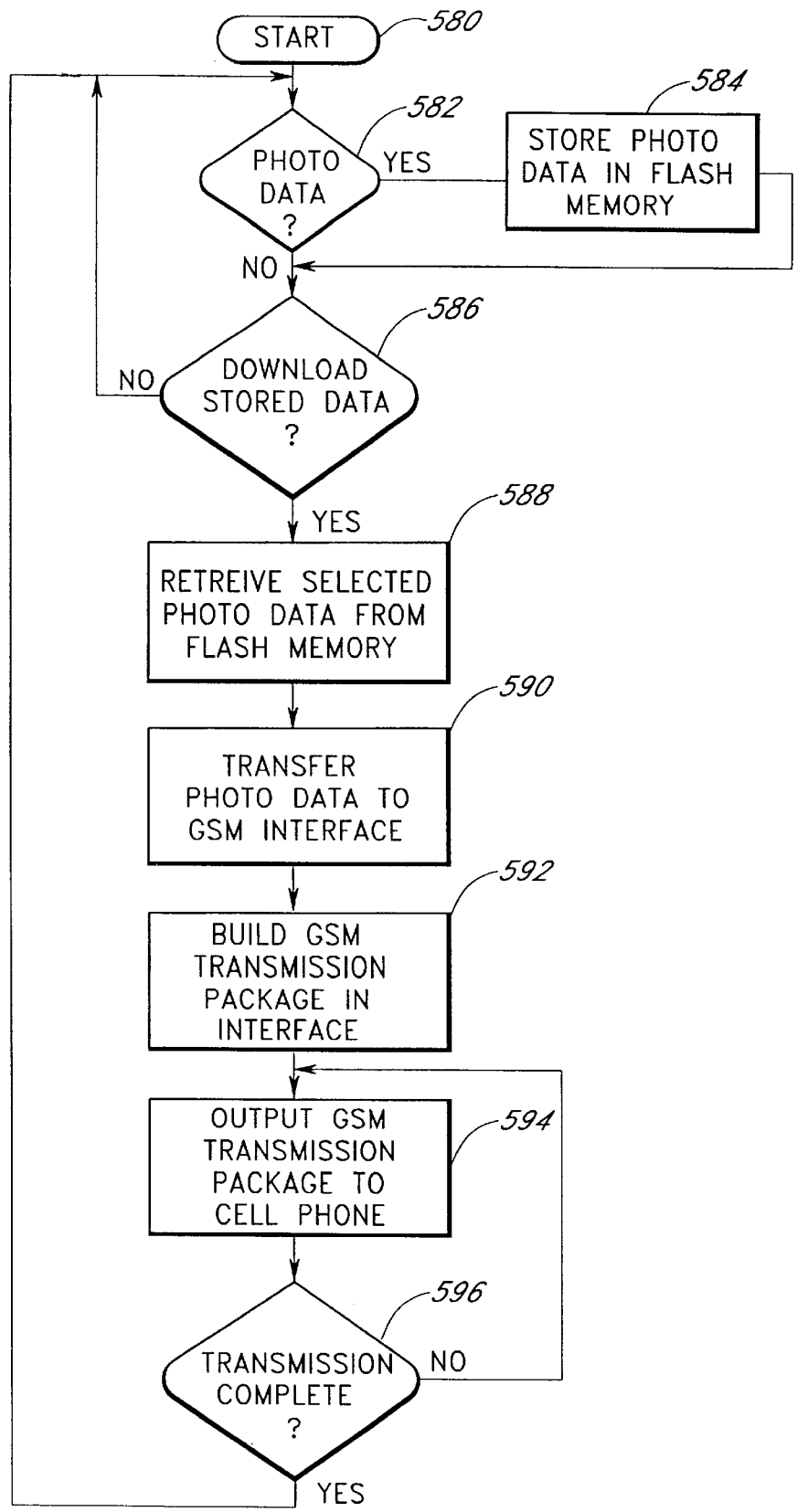
FIG. 5B is a simplified flow chart illustrating the operation of the camera transmission module of FIG. 5A as a digital photograph stored in the flash memory is transmitted via a cellular telephone to a host location.

FIG. 5B is a simplified flow chart which illustrates the process by which the multi-function processor 512 receives the digital information from the camera, stores it in the flash memory, and then transmits it to the remote location via the cellular phone. It will be appreciated by a person of ordinary skill in the art that the flow chart of FIG. 5B is simply exemplary of the basic processes performed by the module 501 and, for clarity, data verification and transmission verification steps relating to this process are not shown.

Referring specifically to FIG. 5B, the process by which photo data from the camera is stored and subsequently downloaded will now be described. From a start state 580, the multi-function controller 512 awaits the transmission of data from the camera processor 507 via the PCMCIA/ATA interface 504. Upon the multi-function controller 512 determining in decision state 582 that a complete packet of photo data has been transmitted, the controller 512 then stores, in state 584, the data in the flash memory 514 in a manner that is known in the art. Subsequently, the controller 512 awaits a signal from the user input device 525 indicating that one or more photo data packets are to be downloaded. The user input device 525 can be comprised of a switch or some such device that the user simply has to manipulate to induce the multi-function controller 512 to initiate the process by which the photo data is provided to the cellular telephone for transmission to the remote location. For clarity, the downloading of the information via the PCMCIA/ATA interface 504 has been omitted from this flow chart, however, it will be appreciated that this process is performed in a manner that is typical to ATA/Flash modules known in the art.

If the multi-function controller 512 determines, in decision state 586, that photo data stored in the flash memory 514 is to be downloaded via the cellular telephone 562, the controller 512 then retrieves, in state 588, the selected photo data from the flash memory 514. This information is then transferred, in state 590, to the GSM interface controller 522. Preferably, the multi-function controller 512 is capable of extracting the photo data directly from the flash memory 514 and then transferring it directly to the GSM interface controller 522. However, in some configurations, using existing flash memory module controllers, it may be necessary for the flash memory to download the stored data via the PCMCIA/ATA interface 504 to the camera processor 507 and then have the camera processor 507 be configured to send the information back through the interface 504 with an appropriate code to indicate to the multi-function controller 512 that the retransmitted data is not to be stored in the flash memory 514 but is to be transmitted directly to the GSM interface controller 522.

Upon receipt of the photo data from the flash memory 514, the GSM interface controller 522 then builds a GSM transmission packet in state 592. As discussed above, the GSM interface controller 522 obtains the GSM interface package configuration information that was previously stored in the RAM 530. As discussed above in connection with the embodiment described in reference to FIG. 2, configuration information can be downloaded via the PCMCIA interface 502 when the module 500 is coupled to a personal computer. The configuration information will include the telephone number that the cellular phone 570 is to be instructed to call and also instructions and algorithms such that the stored flash memory data can be translated into a format that can be transmitted by the particular manufacturer's brand and model of cellular telephone.

As the GSM transmission packet has been developed, the GSM transmission packet is also output along the serial port to the cellular telephone, in state 594. As discussed above, the GSM transmission packet preferably includes a command that is recognizable by the cellular telephone such that the cellular telephone automatically dials the number of the modem 572 at the remote location and then begins transmission of the data corresponding to the stored photo data upon the completion of the communication link between the cell phone and the modem. It will be appreciated that the modem 572 or the computer 574 may need to perform additional processing on the data received from the cellular telephone so as to be able to display the digital picture in the proper format for a user to then use. Once the multi-function controller 512 determines in decision state 596 that the transmission is complete, the multi-function controller 512 then returns to decision state 582 to determine whether new photo data has been transmitted from the camera.

Hence, the system 500 is capable of obtaining digital images with a camera, storing corresponding data in a flash memory, and then transmitting data representative of the digital image, via a cellular telephone, to a remote location in a quick and efficient manner. It will be appreciated that the foregoing discussion is exemplary of one possible use of the ATA flash module of the present invention and that various other uses and modifications may be made so as to allow the data stored in flash memory to be transmitted via a plurality of different interfaces.

It will be further appreciated from the foregoing discussion that the flash memory module of the embodiment described above is capable of transmitting data that is stored in a flash memory in a well known manner through either an ATA flash interface or through an alternate interface. This enhances the flexibility of an electronic device which incorporates the flash memory module of the present invention as this device can then interface with a greater number of other devices. While the functionality of the downloading information out of the flash memory may be performed by the flash memory controller, a person of ordinary skill in the art may appreciate that this functionality may also be performed by additional processors that are associated with the interface or are mounted in addition to the flash memory controller without departing from the spirit of the invention.

Although the preferred embodiments of the present invention have shown, described, and pointed out the fundamental novel features of the invention as applied to this embodiment, it will be understood that various omissions, substitutions and changes in the form of the detail of the devices illustrated may be made by those skilled in the art without departing from the spirit of the present invention. Consequently, the scope of the invention should not be limited to the foregoing discussion but should be defined by the appended claims.

What is claimed is:

1. A flash memory module comprising:

a flash memory for storing data;

a data bus that provides data to the flash memory;

a controller coupled to the flash memory, wherein the controller retrieves data stored in the flash memory and formats the data into a first interface configuration for subsequent transmission to an external device and wherein the controller in response to an external input formats the data into an alternative interface configuration for subsequent transmission to an external device; and a memory device wherein configuration information is stored that is adapted to be used by the controller to translate the data stored in the flash memory into the alternative interface configuration for subsequent transmission to the external device.

2. The module of claim 1, further comprising a first interface device coupled to the controller such that data stored in the flash memory can be selectively downloaded to an external source in the first interface format via the first interface device.

3. The module of claim 2, wherein the first interface device comprises a PCMCIA/ATA device and the first interface format comprise a PCMCIA/ATA interface format.

4. The module of claim 2, further comprising a second interface device coupled to the controller such that data stored in the flash memory can be selectively downloaded to the external source in the second interface format via the second interface device.

5. The module of claim 4, wherein the second interface device comprises a UART.

6. The module of claim 1, wherein the second interface format comprises is a GSM interface protocol.

* * * * *